United States Patent
Huang et al.

(10) Patent No.: US 7,716,533 B2
(45) Date of Patent: May 11, 2010

(54) SYSTEM AND METHOD FOR TRAPPING BUS CYCLES

(75) Inventors: Chung-Ching Huang, Taipei (TW); Chien-Ping Chung, Taipei (TW); Yeh Cho, Taipei (TW)

(73) Assignee: Via Technologies, Inc., Taipei (TW)

( * ) Notice: Subject to any disclaimer, the term of this patent is extended or adjusted under 35 U.S.C. 154(b) by 488 days.

(21) Appl. No.: 11/656,455

(22) Filed: Jan. 23, 2007

(65) Prior Publication Data
US 2008/0010548 A1    Jan. 10, 2008

(30) Foreign Application Priority Data
Jun. 16, 2006    (TW) ............................... 95121668 A

(51) Int. Cl.
*G06F 11/00*    (2006.01)
(52) U.S. Cl. ........................................ 714/43
(58) Field of Classification Search ........................ None
See application file for complete search history.

(56) References Cited

U.S. PATENT DOCUMENTS

| | | | | |
|---|---|---|---|---|
| 5,608,867 | A * | 3/1997 | Ishihara | 714/47 |
| 6,587,966 | B1 * | 7/2003 | Chaiken et al. | 714/34 |
| 6,944,796 | B2 | 9/2005 | Joshi et al. | |
| 7,296,185 | B2 * | 11/2007 | Huang et al. | 714/30 |
| 2005/0060617 | A1 * | 3/2005 | Huang et al. | 714/34 |
| 2007/0168574 | A1 * | 7/2007 | Martinez et al. | 710/15 |

* cited by examiner

*Primary Examiner*—Christopher S McCarthy
(74) *Attorney, Agent, or Firm*—Thomas, Kayden, Horstemeyer & Risley

(57) ABSTRACT

A bus cycle trapping system includes at least one register, a north bridge, a south bridge and a central processing unit (CPU). The register is configured to store at least one trapping parameter. The north bridge traps a bus cycle matching the at least one trapping parameter while issuing an activating signal. The south bridge sends a system management interrupt message according to the activating signal. The CPU enters a system management mode according to the system management interrupt and executes a system management interrupt routine for doing a debugging test of the bus cycle matching the trapping parameter.

11 Claims, 4 Drawing Sheets

SYSTEM AND METHOD FOR TRAPPING BUS CYCLES

BACKGROUND OF THE INVENTION

1. Field of the Invention

The present invention relates to a computer system, and more particularly to system and method for trapping bus cycles of the computer system.

2. Description of the Prior Art

Complete pre-silicon test of an integrated circuit is essential to the production quality of a computer system. Electronic systems are designed to operate in specific ways so as to perform specific functions. During the design process, designers have to debug the functionality of the computer system many times for minimizing or preventing from failures that may occur in manufacture or system operation. In general, the designer needs to gather enough bus cycles of the computer system for debugging purpose. Various hardware tools, such as Logic Analyzer (LA), Hardware ICE (in-circuit emulator), have been employed in verifying bus cycles of the computer system. However, such conventional system has a relative high cost due to extra hardware tools, and is not able to trap some specific bus cycles.

Please refer to FIG. 1, which is a block diagram of a conventional bus cycle trapping system. The system includes a central processing unit (CPU) 10, a north bridge 20 connected to the CPU 10, a south bridge 30 connected with peripheral devices (not shown) through a PCI (Peripheral Component Interconnect) bus 35, an AGP (Accelerated Graphics Port) device 40 and a memory 50 connected with the north bridge 20. The system further includes an LA (Logic Analyzer) 39 connected to the PCI bus 35 for trapping bus cycles. However, since AGP-to-Memory cycles are directly transferred from the AGP device 40 to the memory 50, as indicated by the numeral reference 45, without transmission through the PCI bus 35, the LA 39 is unable to detect any AGP-to-Memory cycles.

Now refer to FIG. 2, which is a block diagram of another conventional bus cycle trapping system. As shown in FIG. 2, the CPU 10 connects to the north bridge 20 through a host bus 15, a Hardware ICE (in-circuit emulator) 17 is connected to the host bus 15 for trapping a specific CPU-to-PCI configuration cycle. The CPU-to-PCI configuration cycle is composed of two writing cycles, which provide configuration address and configuration data 19 to the south bridge 30 respectively. The CPU 10 will send a large number of write cycles with configuration addresses to the south bridge 30. One disadvantage of such a system is that when the hardware ICE 17 is utilized to verify a specified CPU-to-PCI configuration cycle, the hardware ICE 17 has to check all of the write cycles with configuration address, which is time consuming and has low efficiency.

SUMMARY OF THE INVENTION

Improved bus cycle trapping systems and methods therefore are provided.

In an embodiment, a bus cycle trapping system includes at least one register configured to store at least one trapping parameter; a north bridge trapping a bus cycle matching the at least one trapping parameter while issuing an activating signal; a south bridge sending a system management interrupt message according to the activating signal; and a central processing unit optionally entering a system management mode according to the system management interrupt and executing a system management interrupt routine for doing a debugging test of the bus cycle matching the trapping parameter.

Another embodiment of a bus cycle trapping system includes at least one register for storing at least one trapping parameter; and a north bridge for trapping a bus cycle matching the at least one trapping parameter.

In a further embodiment, a method for trapping a bus cycle in a computer system includes steps of: specifying at least one trapping parameter for screening out at least one bus cycle to be trapped; and activating a north bridge of the computer system to trap any bus cycle matching the at least one trapping parameter.

DETAILED DESCRIPTION OF THE INVENTION

To overcome the defects mentioned above, the present invention provides an effective computer system, which can trap the bus cycles efficiently. The present invention will now be described more specifically with reference to the following embodiments.

Figure 1:
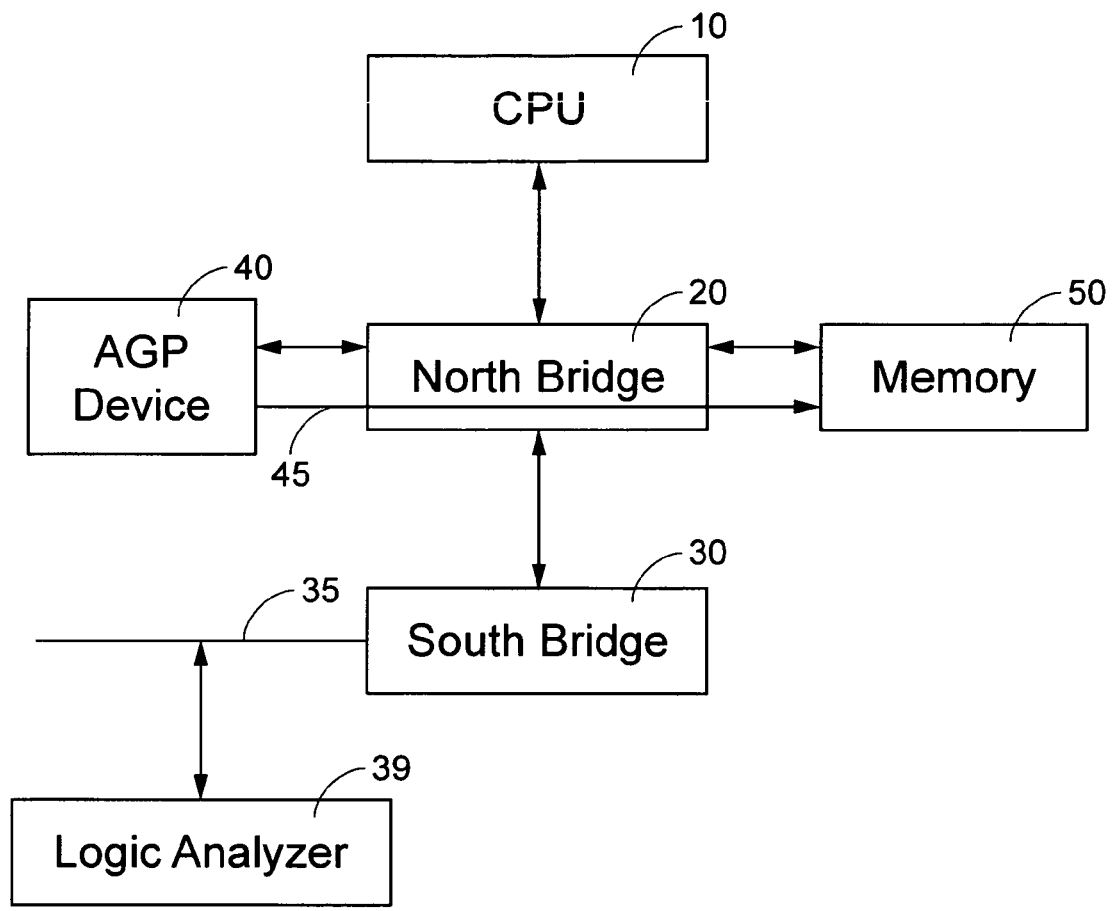
FIG. 1 is a block diagram of a conventional bus cycle trapping system.
Figure 2:
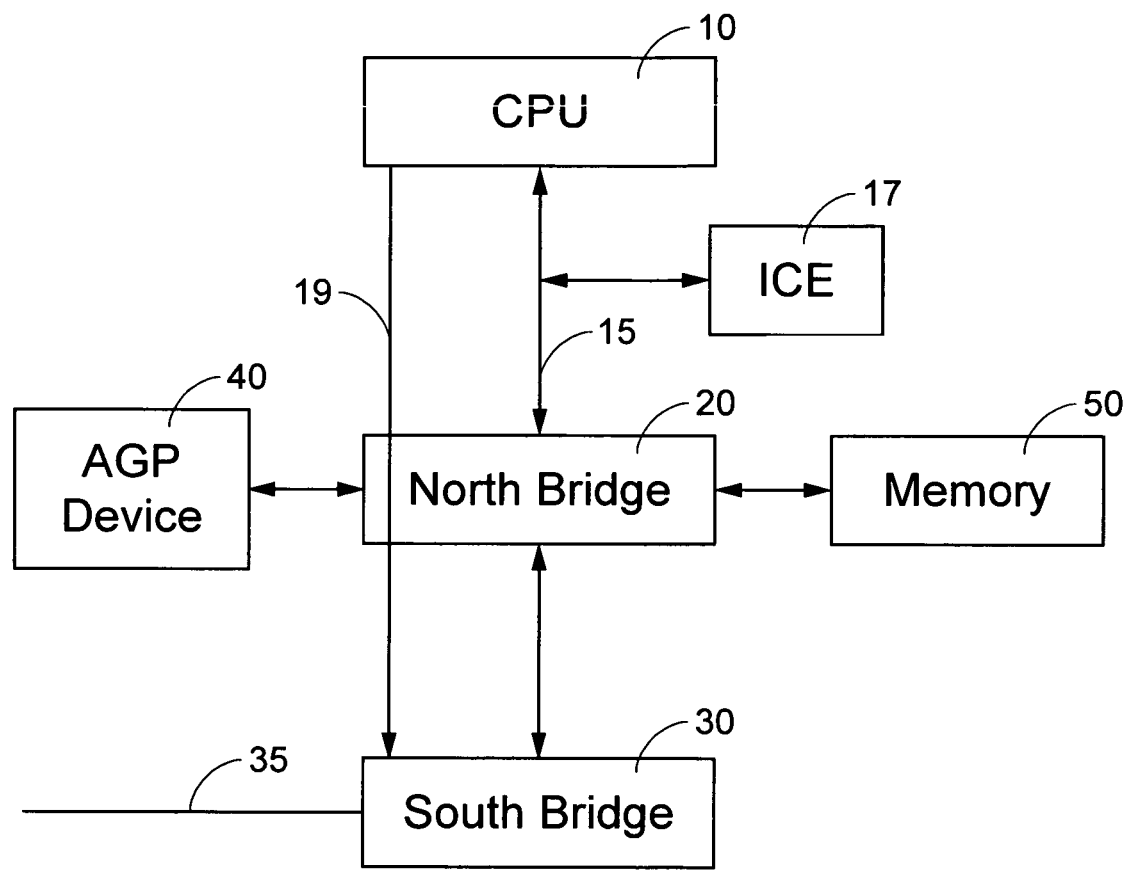
FIG. 2 is a block diagram of another conventional bus cycle trapping system.
Figure 3:
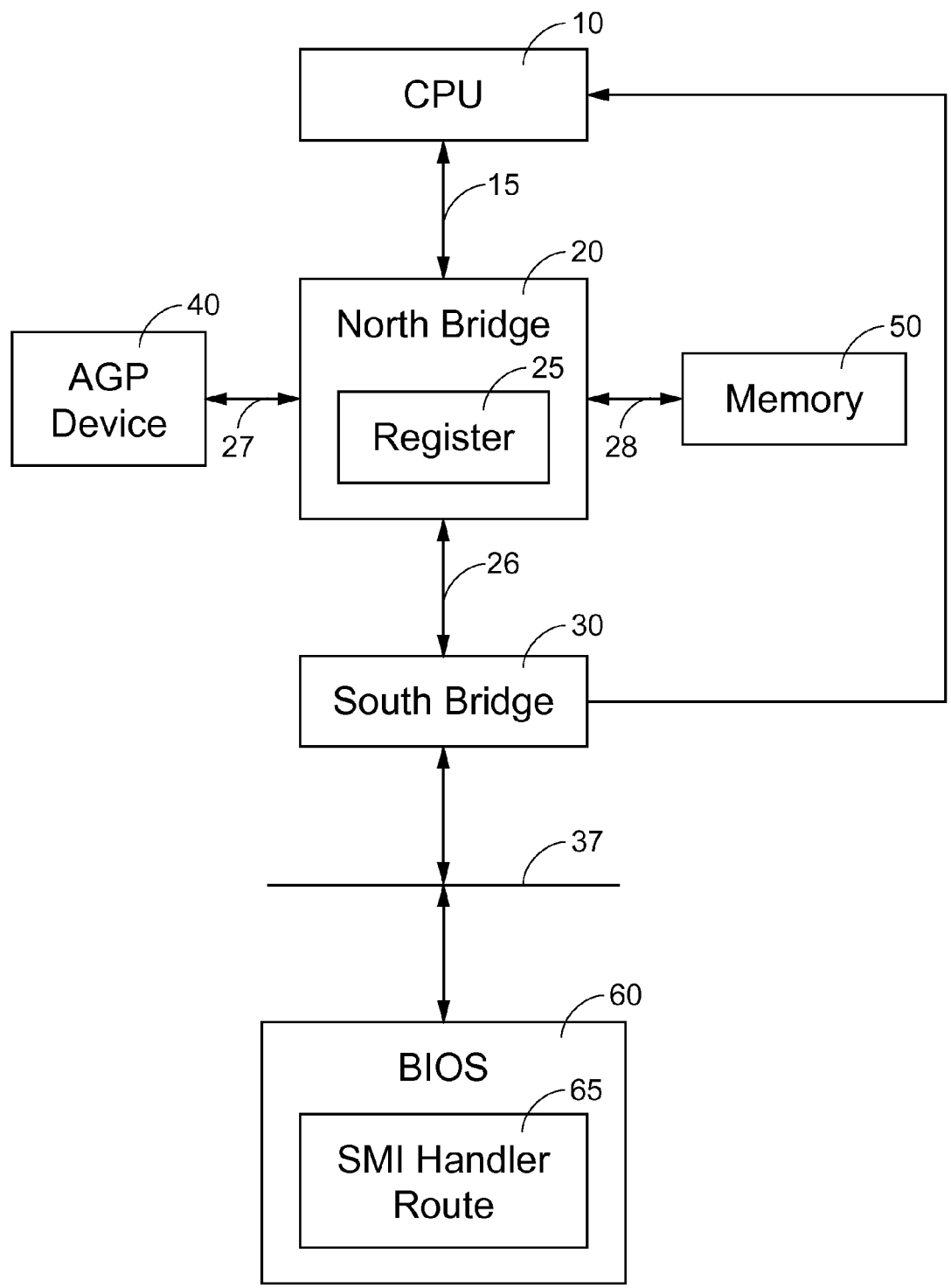
FIG. 3 is a block diagram of a preferred embodiment in accordance with the present invention.

Please refer to FIG. 3, which is a block diagram showing a computer system according to an embodiment of the present invention. The computer system includes a central processing unit (CPU) 10, a north bridge 20, a south bridge 30, an Accelerated Graphics Port (AGP) device 40, a memory 50 and a Basic Input Output System (BIOS) 60. The CPU 10 is connected to the north bridge 30 through a host bus 15. The south bridge 30, the AGP device 40 and the memory 50 are connected to the north bridge 30 through buses 26, 27, 28, respectively. The south bridge 50 and the BIOS 60 communicate with each other via a bus 37, which is configured to comply with specification of industry standard architecture (ISA) or low pin count (LPC) in the preferred embodiment.

Since the north bridge 20 is directly connected to the CPU 10, the south bridge 30, the AGP device 40 and the memory 50, the north bridge 20 can be utilized to grab all the bus cycles passing therethrough, inclusive of the AGP-to-memory cycles, CPU-to-PCI (Peripheral Component Interconnect) configuration cycles and CPU-to-I/O cycles, which are unable to be accessed in the conventional bus cycle trapping systems.

In the preferred embodiment, a register 25 is disposed in the north bridge 20 for storing trapping parameters corresponding to the bus cycles to be trapped. The trapping parameters are specified by the designer, and could be particular type, address or data of the bus cycles, which can distinguish the bus cycles to be trapped from other general bus cycles. For example, if the trapping parameter corresponds to the type of AGP-to-memory cycles, then the cycles of AGP-to-memory type will be trapped while the bus cycles of other type, e.g. CPU-to-PCI configuration type will pass through.

The north bridge 20 could be disposed with a plurality of registers 25 therein, if a certain number of trapping parameters are required. That is, the number of the registers 25 is in accordance with the number of the trapping parameters. In addition, the register 25 for storing a trapping parameter therein could be disposed in anywhere else, such as south bridge, a chip combined the north bridge and the south bridge, etc., so as to trap the bus cycles passing therethrough more efficiently.

The BIOS 60 of the computer system will enter a system management Interrupt (SMI) handler routine 65 to execute debugging test after the north bridge 20 traps desired bus cycles. To describe in more detail, the BIOS 60 in accordance with the preferred embodiment includes a SMI handler routine 65. When the north bridge 20 finds the bus cycles matching the specified trapping parameter, the north bridge 20 will send an activating signal to the south bridge 30. The south bridge 30 then issues a SMI massage to the CPU 10 in response to the activating signal from the north bridge 20. The CPU 10 must enter a system management mode (SMM) according to the SMI massage, and perform the SMI handler routine 65 stored in the BIOS 60 via the connection to the north bridge 20 and the south bridge 30. After that, the BIOS 60 can do any debugging test to find the system problems in the SMI handler routine 65.

It should be noted that when the CPU 10 enters the system management mode, the CPU 10 would cease operations of operating system to run the SMI handler routine 65. That is, the computer system is operated by the SMI handler routine 65 from that moment. However, the CPU 10 must leave the system management mode and return to the operating system after the debugging test is completed. To return control of the computer system to the operation system, the SMI handler routine 65 includes a resume instruction, and the CPU 10 will be switched from the system management mode to the operating system in response to the resume instruction.

Figure 4:
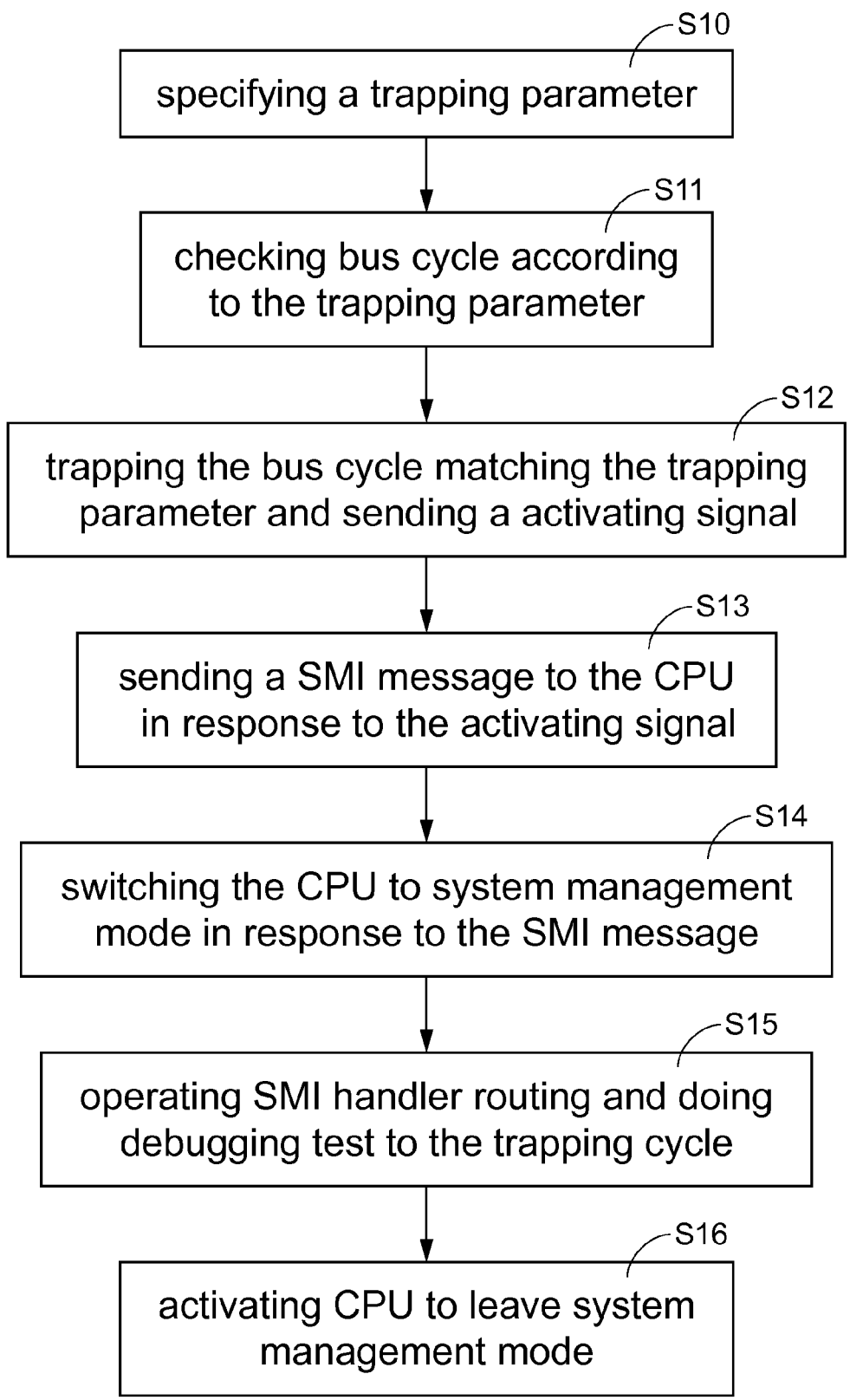
FIG. 4 is a flow chart of an embodiment in accordance with the present invention.

FIG. 4 is a flowchart of a method for trapping bus cycles according to an embodiment of present invention. As shown in FIG. 4, when the designer starts the debugging test, first in step S10 the designer programs the register 25 to specify trapping parameter(s) of the bus cycles to be trapped. After step S10, the process proceeds to step S11 where the north bridge 20 checks whether the bus cycles passing through matches the specified trapping parameter(s). If, at step S11, the north bridge 20 finds any bus cycle matching the trapping parameter(s), the process continues to step S12. The north bridge 20 traps the matching bus cycle while sending an activating signal to the south bridge 30.

Next, the south bridge 30 goes to step S13, sending a SMI massage to the CPU 10 according to the activating signal. At step S14, the CPU 10 enters the system management mode in response to the SMI massage. After step S14, the CPU 10 goes to step S15, executing the SMI handler routine 65 and doing debugging test for the bus cycle trapped by the north bridge 20. When the computer system completes the debugging test, the process goes to step S16 where the CPU 10 is switched from the system management mode to the operating system according the resume instruction of the SMI handler routine 65.

In summary, a bus cycle trapping system and method in accordance with the present invention uses the north bridge or other suitable core logic to trap bus cycles passing therethrough. Further, the north bridge only traps bus cycles matching the trapping parameter(s) specified in advance, so as to achieve a relatively high efficiency. Since most of the bus cycles will pass through the north bridge, the bus cycle trapping system is able to trap almost all kinds of bus cycles transferred in the computer system. Moreover, the cost of the bus cycle trapping system is not so high due to absence of additional hardware tools.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A bus cycle trapping system, comprising:
   at least one register configured to store at least one trapping parameter;
   a north bridge trapping a bus cycle matching the at least one trapping parameter while issuing an activating signal, wherein the register is disposed in the north bridge;
   a south bridge sending a system management interrupt message according to the activating signal; and
   a central processing unit optionally entering a system management mode according to the system management interrupt and executing a system management interrupt routine for doing a debugging test of the bus cycle matching the trapping parameter.

2. The bus cycle trapping system of claim 1, wherein the trapping parameter is a type, address or data information included in a bus cycle.

3. The bus cycle trapping system of claim 1, wherein the system management interrupt routine is stored in a Basic Input Output System (BIOS).

4. The bus cycle trapping system of claim 1, wherein the bus cycle to be trapped is an AGP (Accelerated Graphics Port)-to-memory cycle, a CPU-to-PCI (Peripheral Component Interconnect) configuration cycle or an I/O (input/output) cycle.

5. A method for trapping a bus cycle in a computer system, comprising steps of:
   specifying at least one trapping parameter for screening out at least one bus cycle to be trapped; and
   activating a north bridge of the computer system to trap any bus cycle passing through the north bridge and matching the at least one trapping parameter, wherein the trapping parameter is stored in the north bridge;
   issuing an activating signal by the north bridge chin when there is any bus cycle matching the at least one trapping parameter; and
   issuing a system management interrupt message by a south bridge chin according to the activating signal.

6. The method of claim 5, further comprising a step of:
   switching a central processing unit to a system management mode in response to the system management interrupt message.

7. The method of claim 6, further comprising a step of:
   entering a system management interrupt handler routine and doing a debugging test of the bus cycle matching the trapping parameter.

8. The method of claim 7, further comprising a step of:
   activating the central processing unit to leave the system management mode after the debugging test is completed.

9. The method of claim 5, wherein the trapping parameter is a type, address or data information included in a bus cycle.

10. The method of claim 5, wherein the system management interrupt handler routine is stored in a Basic Input Output System (BIOS) of the computer system.

11. The method of claim 5, wherein the bus cycle to be trapped is AGP (Accelerated Graphics Port)-to-memory cycle, CPU-to-PCI (Peripheral Component Interconnect) configuration cycle or I/O (input/output) cycle.

* * * * *